Patented July 23, 1929.

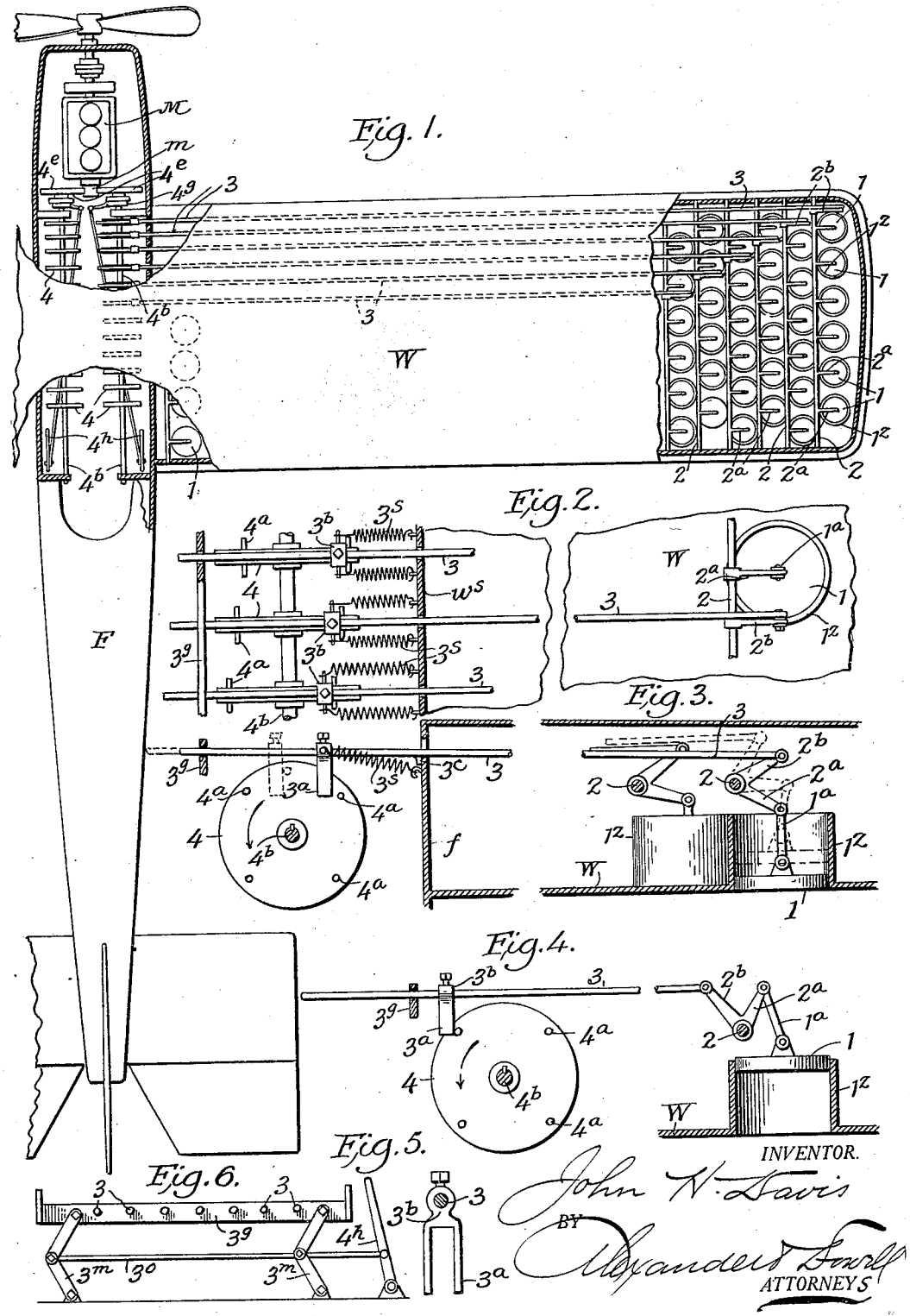

1,721,772

UNITED STATES PATENT OFFICE.

JOHN H. DAVIS, OF PHILADELPHIA, PENNSYLVANIA, ASSIGNOR, BY MESNE ASSIGNMENTS, TO AIR LINE TRANSPORTATION COMPANY, OF PHILADELPHIA, PENNSYLVANIA, A CORPORATION OF DELAWARE.

AIRPLANE.

Application filed December 5, 1927. Serial No. 237,861.

This invention relates to aeronautics, and is especially designed for use in airplanes. The principal object of the invention is to enable an airplane to lift itself vertically particularly in starting, and to arrest its dropping in landing. For this purpose I provide air beaters arranged preferably at the under side of the wing and which may form part of the undersurface of the wing and which can be operated from the motor independently of the propeller, or in connection with the propeller as desired.

Another object of the invention is to enable the airplane when starting to lift itself so as to free it from the drag or traction of the earth; so that a heavily laden plane equipped with my invention when starting can readily clear obstructions which otherwise it would not be able to clear because of the load it carries.

Another object is to enable an airplane when descending to arrest its vertical movement as it nears the ground, thereby preventing the shocks and danger of damage to the plane which would occur if it was dropping too rapidly when landing.

A further object of the invention is to provide an airplane with a plurality of air beaters which can be operated as hereinafter explained; and other minor objects of the invention and the advantages thereof will be hereinafter set forth.

The accompanying drawings diagrammatically illustrate one embodiment of the invention as applied to an airplane and I will describe the same with reference thereto to enable others skilled in the art to adopt and use the invention. The essentials of the invention and novel combinations of parts and novel features of construction for all of which protection is desired are summarized in the claims.

In said drawings:

Fig. 1 is a diagrammatical top plan view, partly broken away, of a portion of an airplane equipped with one embodiment of the invention.

Fig. 2 is an enlarged detail plan view of one of the air beaters and its operating devices.

Fig. 3 is a side view of Fig. 2.

Fig. 4 is a detail view similar to Fig. 3.

Figs. 5 and 6 are details.

In the drawing F represents the fuselage and W the wing of an airplane, which may be of any desired type. Arranged on the under surface of the wing W are a series of what I term air beaters 1. These are preferably arranged in rows extending transversely of the wings, as shown in Fig. 1 and the air beaters in adjacent rows are preferably arranged in quincunx order. The air beaters are shown as circular but may be of any desired contour. Each air beater is preferably arranged within an opening in the underside of the wing W which openings correspond in contour with the air beaters. The air beaters in normal or lowered position (Fig. 3) close the openings—and the lower or underside of the air beaters, when in lowered position, are preferably flush with the lower or underside of the wing, and form a continuation of the lower surface of the underside of the wing as in Fig. 3.

The air beaters 1 are preferably arranged to move within housings $1^z$ which surround the openings and are adapted to prevent air spreading or escaping laterally from beneath the under surface of the air beaters when the latter are depressed, as hereinafter explained.

The air beaters may be moved facewise by any suitable means—In the construction shown, for example, each air beater 1 is connected by a link $1^a$ to a crank arm $2^a$ on a rock shaft 2 extending longitudinally of the row of air beaters and transversely of the wing—(see Fig. 1) and by rocking said shaft all of the beaters in the row can be simultaneously raised or lowered.

The shaft 2 may be rocked by any suitable means. In the construction shown a pull rod 3 is pivotally connected at one end to a crank arm $2^b$ on shaft 2 and extends longitudinally of and within the wing to the fuselage, as shown in the drawings. These rods 3 are normally pulley outward (in a direction away from the fuselage) by means of springs $3^s$ attached to the rods and to a relatively adjacent fixed point as indicated in Fig. 2, and would normally hold the air beaters in lowered position as shown in Fig. 3.

To operate the air beaters the rods 3 may be drawn inward and then released by any suitable means. For this purpose, in the construction shown, each rod 3 is provided on its inner end within the fuselage with a slotted head 3$^b$ which is adapted to straddle the edge of an adjacent rotatable disk 4—the edge of the disk guiding the head, and the head is adapted to be engaged by pins 4$^a$ mounted on a disk 4$^b$, which may be driven from the motor by any suitable means. Each disk is provided with a plurality of pins 4$^a$, four being shown in the drawing, which, as the disk rotates, successively engage the head 3$^b$ and draw the rod 3 outward, as indicated in dotted lines in Fig. 3, and thereby raise the related series of air beaters to the position shown in Fig. 4. But, during the continued rotation of the disk, the pins 4$^a$ will disengage the heads 3$^b$ and springs 3$^s$ will move the rod 3 outward with great rapidity thereby rocking the shaft 2 and lowering the air beaters with great rapidity and force from the position shown in Fig. 4 to the position shown in full lines in Fig. 3.

The inner ends of rods 3 may be slidably supported by a suitable guide; as indicated at 3$^g$ in Figs. 2 and 4. The outward movement of the rods 3 may be arrested, when the lower surface of the beaters is flush with the lower surface of the wing, by any suitable means. As shown stop lugs 3$^c$ on the rods are adapted to engage the side $f$ of the fuselage through which the rods pass.

Each transverse row of air beaters may be operated independently of the other row, and the air beaters if of an unyielding type should be raised slowly, that is perpendicularly to the lower surface of the wing, but if of any type should be lowered with great rapidity and force. The rows of air beaters may be operated successively or simultaneously, or alternately, as may be most desirable according to the size and arrangement of the air beaters. In the construction illustrated when the rods 3 are moved inwardly, (or to the left in Fig. 3) the air beaters 1 would be raised and when the rods are released the springs 3$^s$ will face them rapidly outward and the air beaters will be forcibly and rapidly lowered to the position indicated in Fig. 4.

The rapid downward movement of the air beaters exerts a great lifting effect upon the wing, the lifting effect being in proportion to the extent of surface area of the air beaters and the rapidity of their lowering movement.

In practice the springs could be proportioned to move the air beaters downward at a rate of 352 feet per second. Assuming that the area of an air beater is 50 inches and it is moved downward at a velocity of 352 feet per second it should exert a lifting force or power equal to 312 lbs. per sq. ft. upon the wing. In practical tests of model apparatus an air beater having an area of 6 x 8″ operated by a spring at a speed of 176 feet per second has a lifting effect of 40 lbs. per sq. ft.

An important feature to be borne in mind is that the air beaters must be so constructed or raised so slowly that they exert no back pressure or downward pull on the wing; but they should be lowered with great rapidity and exert their full surface area to impart an upward lift to the wing.

The shaft 4$^b$ may be driven by any suitable means. As indicated in the drawings it may be driven by means of gears 4$^e$ from a pinion $m$ on the shaft of the motor M. Preferably a clutch 4$^g$ of any suitable type is placed between the gear 4$^e$ and the shaft 4$^b$ which clutch can be operatively controlled by a link 4$^i$ connected to a hand lever 4$^h$ adjacent the seat of the operator. The object of this is to enable the operator to throw the air beaters at either side of the fuselage into or out of operation at will, and if desired he can stop the operation of the beaters on one side of the wing while the beaters on the other side of the wing are in operation,—this would enable him to control the lateral stability of the plane if the aerolons fail to operate properly.

As stated I preferably operate rows of air beaters successively on starting from each end of the wing toward the fuselage. This can be easily accomplished by slightly angularly displacing the successive disks on shaft 4$^b$, or the pins on the disks, so that the rods 3 will be operated successively instead of simultaneously; but the rods could be made to operate the air beaters simultaneously or in any desired groups.

In case it is necessary to volplane it would be desirable to have all the beaters in lowered position, as indicated in Fig. 3, so that the under surface of the wing would appear smooth and unbroken. For this purpose means should be provided whereby, if desired, the rods 3 could be disengaged from their positively actuating devices. Whereupon the springs 3$^s$ would immediately throw the rods inward to the position shown in Figure 3 so that the under surface of the movement would appear smooth and unbroken. One means for this purpose would be to make the guide 3$^g$ vertically movable, so that if it was desired to disengage the heads 3$^a$ from the pins 4$^a$ said guide 3$^g$ could be moved up sufficiently to raise the rods and disengage the heads 3$^a$ from the pins 4$^a$. This could be accomplished in various ways. For instance as shown in Figure 6, the guide 3$^g$ could be supported on toggles 3$^m$ operatively connected by a rod 3$^o$ connected to the hand lever 4$^h$, so that when this lever is operated to throw out the clutch, the guide 3$^g$ would be raised and lift the rods 3 sufficiently to clear the heads 3$^a$ from the pins 4$^a$. When the lever 4$^h$ is shifted to engage the clutch, the guide 3$^g$ would be lowered and permit heads 3$^a$ to again engage the pins 4$^a$.

While I have shown the air beaters as cylindric in contour and moving in cylindric housings my invention is not restricted to any particular form or contour of the air beaters or the chambers. The air beaters may be adapted to be reciprocated or be hinged and vibrate, or be diaphragms, within the scope of the invention, the essential features of the invention being the provision of a plurality of air beaters which can be operated in the manner described to exert a great vertical lifting power upon the wing when starting the machine, or to cushion or arrest the vertical dropping of the machine upon the earth in making a landing. The air beaters could be arranged to operate at an inclination to the wing so that in addition to the lifting effect they would also tend to propel the plane forward, but this propulsive effect is not so important in the present case as the lifting effect.

I claim:—

1. In an airplane, a plurality of air beaters on the wing means for operating these air beaters to lift the wing and means for preventing lateral diffusion of the displaced air during the descent of the beaters.

2. In an airplane, a plurality of air beaters on the underside of the wing, means for operating these air beaters with great rapidity and means for preventing lateral diffusion of the displaced air during the descent of the beaters.

3. In an airplane, a series of small air beaters disposed on the under surface of the wing, means for rapidly moving the air beaters in a direction to exert a lifting effect upon the wing and means for preventing lateral diffusion of the displaced air during the descent of the beaters.

4. In an airplane, a series of air beaters arranged on the wing, means for depressing the air breaters with great rapidity to exert a lifting effect upon the wing, and means to prevent lateral escape of air beneath the air beaters as they are depressed.

5. In an airplane, a plurality of air beaters, and means for operating these air beaters at great rapidity on one stroke and slowly on the opposite stroke.

6. In an airplane, a series of air beaters disposed on the under surface of the wing, and means for rapidly depressing the air beaters to exert a lifting effect upon the wing, and means for more slowly raising the air beaters.

7. In an airplane, a series of air beaters arranged in quincunx order on the underside of the wing, means for depressing the air beaters with great rapidity to exert a lifting effect upon the wing, and means to prevent lateral escape of air beneath the air beaters as they are depressed.

8. In an airplane, air beaters disposed in quincunx order on the under surface of the wing, means for rapidly depressing the air beaters to exert a lifting effect upon the wing.

9. In an airplane, a wing provided with a plurality of openings, air beaters arranged in said openings, means for moving the air beaters with great rapidity to exert a lifting effect upon the wing, and means to prevent lateral escape of air beneath the beaters when the same are depressed.

10. In an airplane, a wing provided with a series of openings in its under surface, air beaters arranged to move within these openings, means for moving the air beaters with great rapidity in a direction to exert a lifting effect upon the wing, and housings around the openings to prevent lateral escape of air beneath the beaters.

11. In an airplane, a wing provided with a series of air beaters, means for depressing the air beaters with great rapidity to exert a lifting effect upon the wing, means for retracting the air beaters slowly, and means to prevent lateral escape of air beneath the air beaters as they are depressed.

12. In an airplane, rows of air beaters disposed in quincunx order on the under surface of the wing, means for rapidly depressing the air beaters to exert a lifting effect upon the wing, and means for slowly raising the air beaters.

13. In an airplane, a wing provided with a series of openings, air beaters arranged in said openings, means for moving the air beaters with great rapidity in one direction to exert a lifting effect upon the wing, means for moving the air beaters slowly in the other direction, housings around the openings in the wing to prevent lateral escape of air beneath the beaters when the same are depressed.

14. In an airplane, a wing provided with a series of openings in its undersurface, air beaters arranged to move within these openings, means for moving the air beaters slowly in one direction, and for moving the air beaters with great rapidity in the other direction to exert a lifting effect upon the wing, and housings around the openings in the wing to prevent lateral escape of air beneath the beaters when the same are depressed.

15. In an airplane, a plurality of rows of air beaters on the underside of the wing and means for successively operating the rows of air beaters to lift the wing.

16. In an airplane, a plurality of air beaters and means for successively operating the air beaters with great rapidity on one stroke and slowly on the opposite stroke.

17. In an airplane, a series of rows of air beaters disposed on the under surface of the wing, means for successively rapidly depressing air beaters to exert a lifting effect upon the wing, and means for more slowly raising the air beaters.

18. In an airplane, a series of rows of air beaters arranged on the underside of the wing, means for successively depressing the rows of air beaters with great rapidity to exert a lifting effect upon the wing, and means for raising the depressed air beaters more slowly.

19. In an airplane, a wing provided with a series of rows of openings, air beaters arranged in said openings, and means for successively moving the air beaters in different rows to exert a lifting effect upon the wing.

20. In an airplane, a wing provided with a series of rows of openings, air beaters arranged in said openings, and means for successively moving the air beaters in different rows to exert a lifting effect upon the wing and means to prevent lateral escape of air beneath the beaters when the same are depressed.

21. In an airplane, a wing provided with a series of rows of openings in its under surface, air beaters arranged to move within these openings and for successively moving the air beaters in different rows with great rapidity in one direction to exert a lifing effect upon the wing, and means for moving the air beaters slowly in the opposite direction.

22. In an airplane, a wing provided with a series of rows of openings in its under surface, air beaters arranged to move within these openings and for successively moving the air beaters in different rows with great rapidiy in one direction to exert a lifting effect upon the wing, and means for moving the air beaters slowly in the opposite direction, housings around the openings in the wing to prevent lateral escape of air beneath the beaters when the same are depressed.

23. In an airplane, an air beater, means for moving the air beater with great velocity on one stroke and relatively slowly on the opposite stroke, and means for preventing lateral diffusion of the displaced air during the descent of the beater.

24. In an airplane, a plurality of air beaters, means for operating these air beaters at great velocity on one stroke and relatively slowly on the opposite stroke, and means for preventing lateral diffusion of the displaced air during the descent of the beaters.

JOHN H. DAVIS.